United States Patent
Ahn et al.

(10) Patent No.: US 8,442,194 B2
(45) Date of Patent: May 14, 2013

(54) APPARATUS AND METHOD FOR BLOCKING SPECIFIC NETWORK IN MOBILE COMMUNICATION TERMINAL

(75) Inventors: Ho-Jung Ahn, Seoul (KR); Jin-Woo Choi, Seoul (KR); Dong-Seok Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 12/499,418

(22) Filed: Jul. 8, 2009

(65) Prior Publication Data
US 2010/0008487 A1    Jan. 14, 2010

(30) Foreign Application Priority Data
Jul. 14, 2008 (KR) .................. 10-2008-0068094

(51) Int. Cl.
*H04B 7/00* (2006.01)
*H04W 4/00* (2009.01)

(52) U.S. Cl.
USPC ............. 379/201.01; 455/512; 455/432.3; 455/435.2

(58) Field of Classification Search ............... 455/432.3, 455/435.1, 435.2, 552.1, 67.11, 435.3, 418, 455/419, 410, 411, 412, 407, 432.1, 439, 436, 442, 550.1, 434; 370/331, 319, 328
See application file for complete search history.

(56) References Cited

U.S. PATENT DOCUMENTS

| 5,903,832 A * | 5/1999 | Seppanen et al. ........... 455/435.3 |
| 7,826,842 B2 * | 11/2010 | Buckley et al. ............ 455/435.2 |
| 2005/0064821 A1 * | 3/2005 | Hedberg et al. ............ 455/67.11 |

FOREIGN PATENT DOCUMENTS

| KR | 2001-0036126 A | 5/2001 |
| KR | 10-0561685 B1 | 3/2006 |
| KR | 10-0678131 B1 | 2/2007 |
| KR | 10-0762165 B1 | 10/2007 |

* cited by examiner

*Primary Examiner* — Kent Chang
*Assistant Examiner* — Nelson Rosario
(74) *Attorney, Agent, or Firm* — Jefferson IP Law, LLP

(57) ABSTRACT

An apparatus and a method for blocking a specific network in a mobile communication terminal are provided. The method includes adding a first network to a blocked network list, when the first network is the only network available to provide service to a terminal, temporarily removing the first network from the blocked network list and temporarily receiving service from the first network. Thus, the user does not have to pay roaming fees in the unwanted network, suffer from undesired communication quality, or use unwanted additional functions.

14 Claims, 5 Drawing Sheets

APPARATUS AND METHOD FOR BLOCKING SPECIFIC NETWORK IN MOBILE COMMUNICATION TERMINAL

PRIORITY

This application claims the benefit under 35 U.S.C. §119(a) of a Korean patent application filed in the Korean Intellectual Property Office on Jul. 14, 2008 and assigned Serial No. 10-2008-0068094, the entire disclosure of which is hereby incorporated by reference.

BACKGROUND OF THE INVENTION

1. Field of the Invention

The present invention relates to an apparatus and a method for blocking a specific network in a mobile communication terminal. More particularly, the present invention relates to an apparatus and a method for designating a network of an unwanted service reception as a blocked network, managing the blocked network and releasing the blocked network.

2. Description of the Related Art

Many portable terminals on the market today provide an automatic network selection function. The automatic network selection function is useful when a user is located in a region such as Europe which includes several countries and several service providers. That is, when a network signal strength of a service provider in an adjacent country is greater than a signal strength of a registered home Public Land Mobile Network (PLMN) of the user's terminal, the service is automatically switched to the network having the greater signal strength. However, in such a case, the user is likely to use a roaming network and thus pay a roaming fee.

To avoid such a disadvantage, most users make use of a manual network selection function of the terminal. By virtue of the manual network selection function of the terminal, the user can acquire a list of available PLMNs at the current location and select a desired intended network from the acquired list of available PLMNs. Thus, using the manual network selection function, it is possible to block the use of the unintended network as compared to the automatic network selection function.

However, the user still suffers from inconvenience when using the manual network selection function. That is, the manual network selection function only allows use of the network selected by the user. Accordingly, when the user moves to a region of the selected network that has weak signal strength, the terminal is subject to a temporarily limited service reception or no service status. As a result, the normal call reception and transmission is not feasible. Furthermore, under the weak signal strength of the registered network, even when roaming to another network is allowed, the user may not want to use a specific network. For example, the specific networks not wanted to be used by the user can include a provider network which imposes a high roaming fee, a network which provides an unwanted service, and a network of unsatisfactory service quality. In this situation, the user may want to use the service from other networks than the specific network.

The user can use a preferred network function. The preferred network function generates a list of available networks for use during roaming and defines the priority of the networks in the generated network list. However, using the preferred network function, the user needs to determine the network list and adjust the priority with every location change, and cannot block an unconscious use of the unintended network. In this case, the user can ask for service permission from the other networks than the specific network.

SUMMARY OF THE INVENTION

An aspect of the present invention is to address at least the above mentioned problems and/or disadvantages and to provide at least the advantages described below. Accordingly, an aspect of the present invention is to provide an apparatus and a method for blocking a specific network in a mobile communication terminal.

Another aspect of the present invention is to provide an apparatus and a method for designating a network corresponding to an unwanted service as a blocked network, managing the blocked network and releasing the blocked network in a mobile communication terminal.

Yet another aspect of the present invention is to provide an apparatus and a method for operating according to a preset terminal operation mode when there exists only a blocked network as an available network at a current terminal location by receiving service from the blocked network by temporarily removing the blocked network from a blocked network list when the service reception to the corresponding blocked network is set, and maintaining a limited service status when the service reception to the corresponding blocked network is not set in a mobile communication terminal.

According to an aspect of the present invention, a method for blocking a network in a mobile communication terminal is provided. The method includes adding a first network to a blocked network list, when the first network is the only network available to provide service to a terminal, temporarily removing the network from the blocked network list and receiving service from the first network.

According to another aspect of the present invention, an apparatus for blocking a network in a mobile communication terminal is provided. The apparatus includes a blocked network manager for adding a first network to a blocked network list, for temporarily removing the first network from the blocked network list when the first network is the only network available to provide service to a terminal, and for receiving service from the first network and a storage unit for storing the blocked network list.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide Exemplary embodiments of the present invention provide a method for designating a network of an unwanted service reception as a blocked network, managing the blocked network and releasing the blocked network in a mobile communication terminal. A user may designate an unwanted specific network as the blocked network. When the blocked network is the only available network at a particular time, the user may pre-set whether or not to receive the service from the corresponding blocked network.

Figure 1:
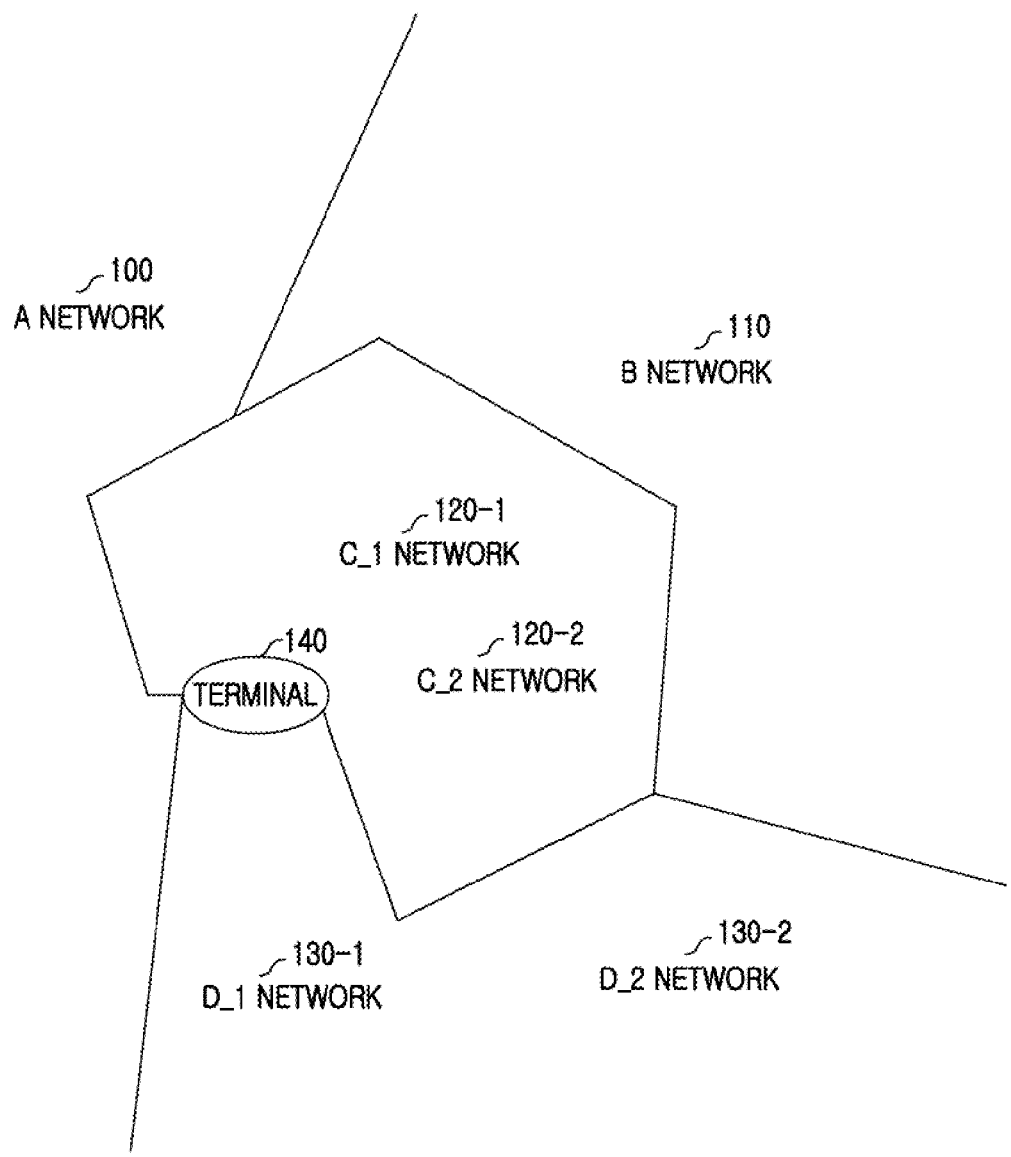
FIG. 1 illustrates a roaming network environment according to an exemplary embodiment of the present invention.

FIG. 1 depicts a roaming network environment according to an exemplary embodiment of the present invention.

In FIG. 1, A network 100, B network 110, C_1 network 120-1, C_2 network 120-2, D_1 network 130-1, and D_2 network 130-2 are networks which offer communication service to terminals within their corresponding service coverage areas. The C_1 network 120-1 and the C_2 network 120-2 are different networks belonging to the same country, the D_1 network 130-1 and the D_2 network 130-2 are different networks belonging to the same country, and the A network 100 and the B network 110 belong to different countries. A terminal 140 travels in a region where the different networks exist together, and a terminal user spends time in one or more border areas. Naturally, a roaming network may be used frequently according to a radius of the movement of the terminal user.

Figure 2:
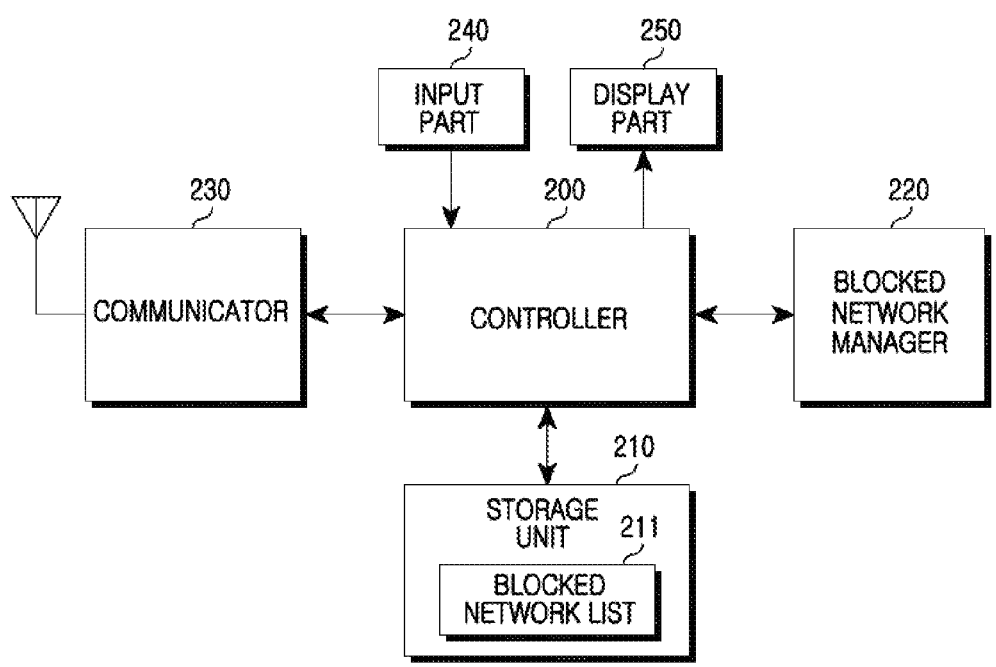
FIG. 2 illustrates a mobile communication terminal according to an exemplary embodiment of the present invention.

FIG. 2 is a block diagram of a mobile communication terminal according to an exemplary embodiment of the present invention.

The mobile communication terminal of FIG. 2 includes a controller 200, a storage unit 210, a blocked network manager 220, a communicator 230, an input part 240, and a display part 250.

The controller 200 controls operations of the mobile communication terminal. In particular, the controller 200 controls functions for designating a network corresponding to an unwanted service as a blocked network, for managing the blocked network and for releasing the blocked network.

The storage unit 210 stores programs and various information needed for operation of the mobile communication terminal. For example, the storage unit 210 stores a list of blocked networks 211.

The blocked network manager 220 sets the blocked networks by adding a network, which is selected by the user to have its service blocked, to the blocked network list 211. The blocked network manager 220 also manages the set of blocked networks according to a preset terminal operation mode. More specifically, when the blocked network is the only available network at the current location of the terminal, according to the preset terminal operation mode, the blocked network manager 220 receives service from the blocked network by temporarily removing the blocked network from the blocked network list when the service reception of the corresponding blocked network is set. Also, the blocked network manager 220 maintains the limited service status when the service reception of the corresponding blocked network is not set. The blocked network manager 220 unblocks the corresponding network by removing the network selected by the user from the blocked network list.

The communicator 230 processes signals transmitted and received over an antenna. The input part 240 includes a plurality of function keys and provides data corresponding to a key pressed by the user to the controller 200. The display part 250 displays status information, numerals, and characters generated in the operation of the mobile communication terminal.

Figure 3:
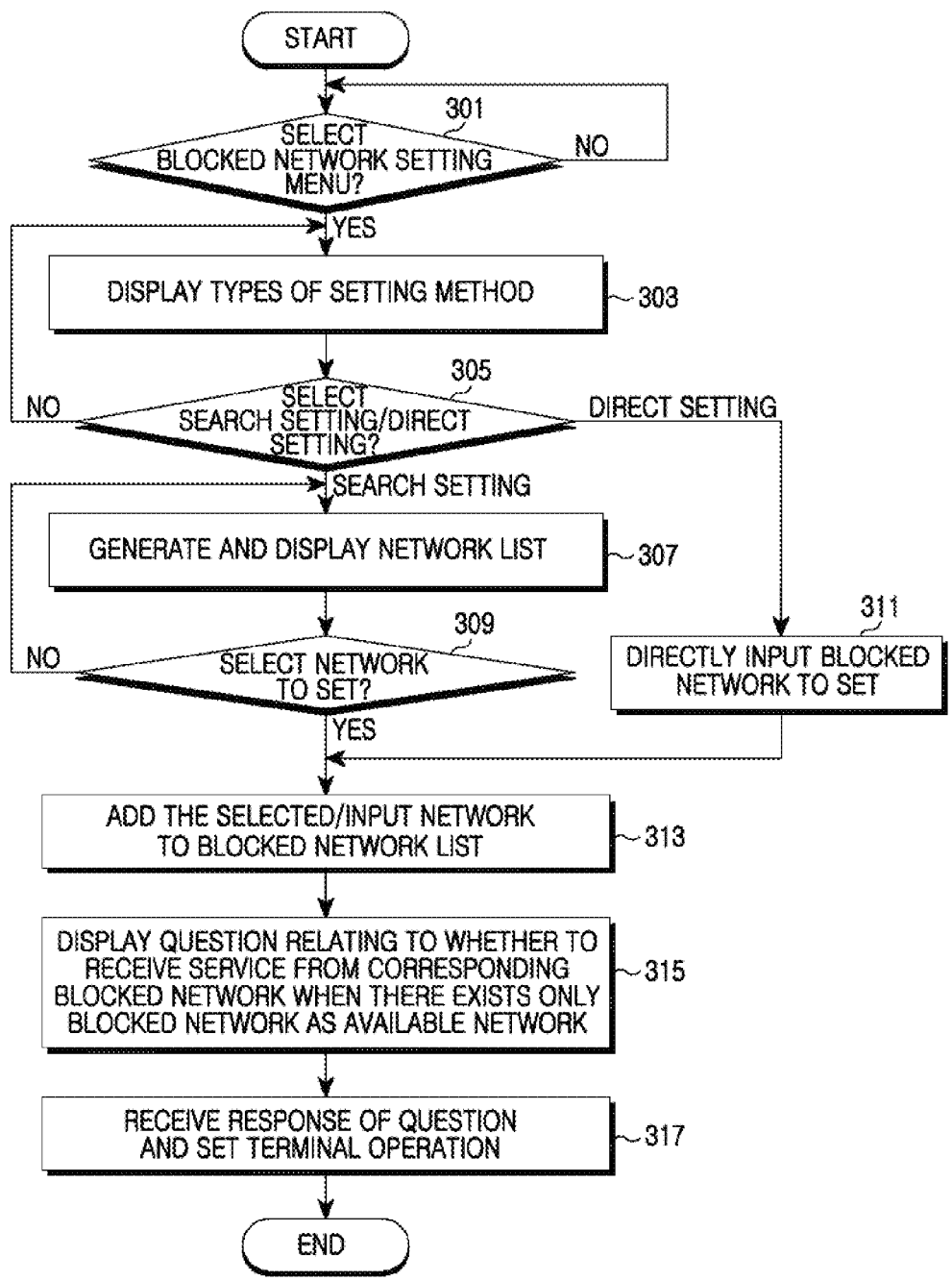
FIG. 3 illustrates a method for setting a blocked network in a mobile communication terminal according to an exemplary embodiment of the present invention.

FIG. 3 is a flowchart of a method for setting a blocked network in a mobile communication terminal according to an exemplary embodiment of the present invention.

In step 301, the terminal determines whether a blocked network setting menu is selected according to a key manipulation by the user. When the blocked network setting menu is selected, the terminal displays types of blocked network setting methods in the display part by entering the blocked network setting mode in step 303. When the blocked network setting menu is not selected, the terminal returns to step 301. In an exemplary embodiment, the types of blocked network setting methods include a search setting method and a direct setting method by way of example. Note that various setting methods may alternatively be employed.

In step 305, the terminal examines whether one of the blocked network setting methods is selected by a key manipulation of the user. That is, the terminal determines whether the search setting method or the direct setting method is selected. When neither the search setting method nor the direct setting method is selected in step 305, the terminal returns back to step 303.

When the search setting method is selected in step 305, the terminal searches neighboring network signals in the current region of the terminal, generates the available network list using the searched network signals, and displays the generated available network list in the display part in step 307. In step 309, the terminal determines whether the user selects a network to be designated as the blocked network from the displayed available network list. In an exemplary implementation, the selection may be made by key manipulation of the user. When the network to be designated as the blocked network is not selected, the terminal returns back to step 307. When the network to be designated as the blocked network is selected, the terminal proceeds to step 313.

On the other hand, when the direct setting method is selected in step 305, the terminal directly receives the network to be designated as the blocked network from the user in step 311 and proceeds to step 313. Herein, the user may personally input the blocked network using a Mobile Country Code (MCC)/Mobile Network Code (MNC) associated with the network to be blocked.

In step 313, the terminal adds the network selected by the user in step 309 or the network personally input from the user in step 311, to the blocked network list and designates the network as a blocked network.

As the terminal moves corresponding to movement of the user, a case may arise in which the only available network in the new location of the user is the network belonging to the blocked network list. In this situation, the terminal provides an option to the user in relation with the operation of the terminal. More specifically, the terminal displays a question asking whether to receive service from the corresponding blocked network in step 315.

In step 317, the terminal receives a response from the user in reply to the service reception question and sets the operation of the terminal based on the input response.

Next, the terminal finishes this process.

Figure 4:
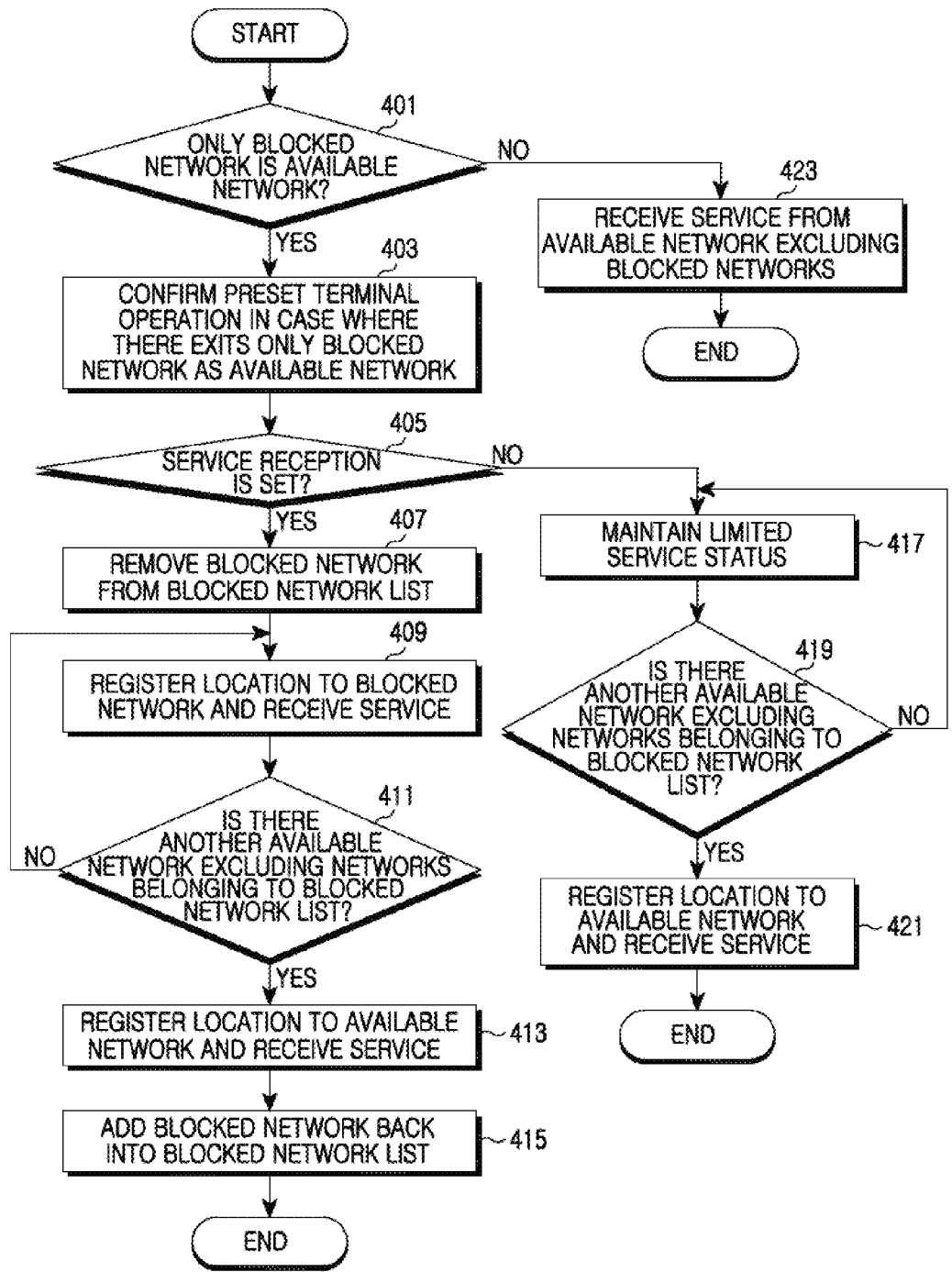
FIG. 4 illustrates a method for managing a blocked network in a mobile communication terminal according to an exemplary embodiment of the present invention.

FIG. 4 is a flowchart of a method for managing a blocked network in a mobile communication terminal according to an exemplary embodiment of the present invention.

In step 401, the terminal determines whether the only available networks in the current location of the terminal are networks belonging to the blocked network list. When the only available networks are those included on the blocked network list, the terminal confirms the terminal operation preset for such a case in step 403. That is, the terminal confirms whether to receive the service from the corresponding blocked network as described earlier.

In step 405, the terminal determines whether the service reception from the corresponding blocked network is set. When it is determined that the service reception from the corresponding blocked network is set in step 405, that is, when it is determined that service will be received from the network included on the blocked network list, the terminal temporarily removes the presently blocked network from the blocked network list in step 407. In step 409, the terminal registers with the previously blocked network and then receives service from the previously blocked network. In step 411, the terminal determines if there is a network not included on the blocked network list that is available to provide service based on the current location and status of the terminal. When another network not included on the blocked network list is available to provide service to the terminal, the terminal terminates the service from the previously blocked network, registers for service with the available network and then receives the service in step 413. Next, the terminal adds the temporarily removed blocked network back to the blocked network list in step 415. On the other hand, when it is determined that there are no available networks not included on the blocked network list in step 411, the terminal returns back to step 409.

Referring again to step 405, when it is determined that service reception from the corresponding blocked network is not set, that is, when the terminal determines that service will be received only from networks not included on the blocked network list, the terminal maintains the limited service status in step 417. In step 419, the terminal determines if there is a network not included on the blocked network list that is available to provide service based on the current location and status of the terminal. When another network not included on the blocked network list is available to provide service to the terminal, the terminal terminates the limited service status, registers with the available network, and then receives service from the available network in step 421. On the other hand, when it is determined that there are no available networks not included on the blocked network list in step 419, the terminal returns to step 417.

In contrast, if it is determined in step 401 that the terminal is located in a region in which networks not included on the blocked network list are available, the terminal receives service from such a network in step 423.

Next, the terminal finishes this process.

Figure 5:
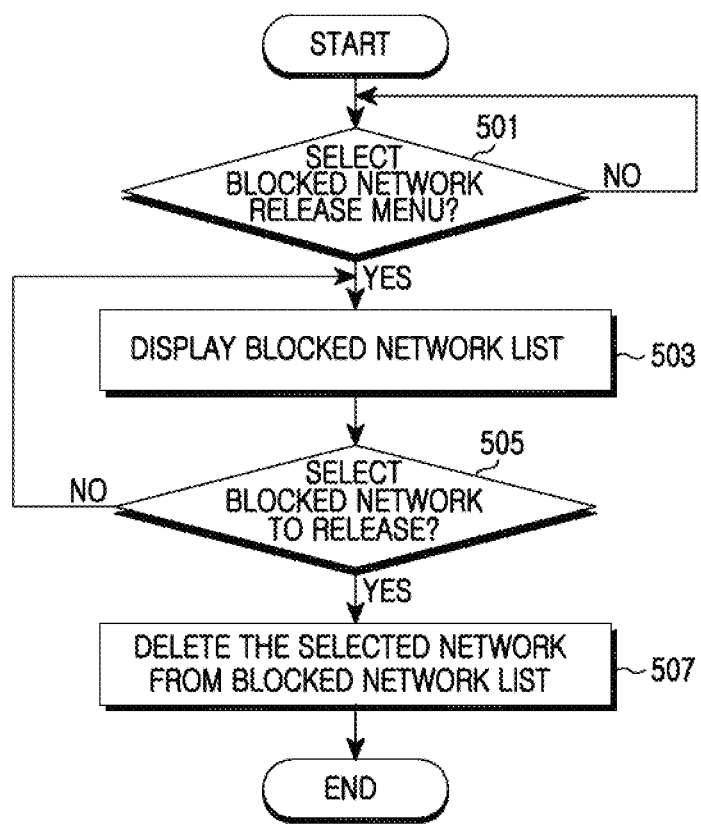
FIG. 5 illustrates a method for releasing a blocked network in a mobile communication terminal according to an exemplary embodiment of the present invention.

FIG. 5 is a flowchart of a method for releasing a blocked network in a mobile communication terminal according to an exemplary embodiment of the present invention.

In step 501, the terminal determines whether a blocked network release menu is selected by key manipulation of the user. When the blocked network release menu is selected, the terminal enters the blocked network release mode and displays the blocked network list including the blocked networks previously designated by the user in step 503. When the blocked network release menu is not selected, the terminal returns back to step 501.

In step 505, the terminal determines whether a network to be unblocked is selected from the displayed blocked network list by key manipulation of the user. When a network to unblock is not selected, the terminal returns to step 503. On the other hand, when a network to be unblocked is selected, the terminal unblocks the corresponding network by removing the selected network from the blocked network list in step 507.

Next, the terminal finishes this process.

While the blocked network releasing method is the search and release method as described in this exemplary embodiment, the direction release method may alternatively be employed. That is, the terminal may unblock the corresponding network by directly receiving the MCC/MNC of the network to be unblocked from the user.

As set forth above, according to an exemplary apparatus and method for setting the network associated with an unwanted service reception to the blocked network, managing and releasing the blocked network in the mobile communication terminal, the user is not inconvenienced by an excessive roaming fee in the unwanted network, need not suffer from the undesired communication quality, nor use the unwanted additional functions. In particular, exemplary embodiments of the present invention may prove notable effectiveness in situations where there are many neighboring countries such as in Switzerland, where there are different networks within the country, where the boundaries of the service coverage of the networks overlap with each other, or where the roaming environment is frequently changed according to the movement of the terminal user.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for blocking a network in a mobile communication terminal, the method comprising: when the only networks available to provide service to a terminal are networks on a blocked network list of the terminal, requesting an input from a user regarding an alternative network and temporarily removing a first network from the blocked network list according to the received user input; receiving service from the first network; determining whether another network, not included on the blocked network list, is available to provide service to the terminal while receiving service from the first network; when the other network is available, terminating the service from the first network and receiving service from the other network and adding the first network back to the blocked network list.

2. The method of claim 1, further comprising:
confirming setting information regarding reception of service from the first network in a case where the first network is on the blocked network list and there exists only the first network as an available network,
wherein the temporarily removing of the first network from the blocked network list is carried out when the setting information sets the service reception from the corresponding blocked first network.

3. The method of claim 2, further comprising:
when the setting information does not set the service reception from the corresponding blocked first network, maintaining a limited service status;
determining whether another network, not included on the blocked network list, is available to provide service to the terminal during the limited service status; and
when the other network is available, terminating the limited service status and receiving service from the other network.

4. The method of claim 1, further comprising:
when another network, not included on the blocked network list is available to provide service to the terminal, receiving service from the other network.

5. The method of claim 1, wherein the adding of the first network to the blocked network list comprises:
according to a blocked network setting menu selection, generating an available network list by searching available networks;
displaying the generated available network list; and
when the first network is selected from the displayed available network list, adding the selected first network to the blocked network list.

6. The method of claim 1, wherein the adding of the first network to the blocked network list comprises:
inputting at least one of a Mobile Country Code (MCC) and a Mobile Network Code (MNC) of the first network according to a blocked network setting menu selection; and
adding the first network corresponding to the input of at least one of the MCC and the MNC to the blocked network list.

7. The method of claim 1, further comprising:
when a blocked network release menu is selected, displaying the blocked network list; and
when the first network is selected from the displayed blocked network list, removing the first network from the blocked network list.

8. An apparatus for blocking a network in a mobile communication terminal, the apparatus comprising: a blocked network manager for adding a first network to a blocked network list, for temporarily removing the first network from the blocked network list when the first network is the only network available to provide service to a terminal, according to a user input received when no networks not on the blocked list are available, and for receiving service from the first network; and a storage unit for storing the blocked network list, wherein the blocked network manager determines whether another network, not included on the blocked network list, is available to provide service to the terminal while receiving service from the first network, terminates the service from the first network and receives service from the other network when the other network is available, and adds the first network back to the blocked network list.

9. The apparatus of claim 8, wherein the blocked network manager confirms setting information regarding reception of service from the first network in a case where the first network is on the blocked network list and there exists only the first network as an available network, and temporarily removes the first network from the blocked network list when the setting information sets the service reception from the corresponding blocked first network.

10. The apparatus of claim 9, wherein the blocked network manager maintains a limited service status when the setting information does not set the service reception from the corresponding blocked first network, determines whether another network, not included on the blocked network list, is available to provide service to the terminal during the limited service status, and terminates the limited service status and receives service from the other network when the other network is available.

11. The apparatus of claim 8, wherein, when another network, not included on the blocked network list, is to provide service to the terminal, the blocked network manager receives service from the other network.

12. The apparatus of claim 8, wherein the blocked network manager generates an available network list by searching for available networks according to a blocked network setting menu selection, displays the generated available network list, and, when the first network is selected from the displayed available network list, adds the selected first network to the blocked network list.

13. The apparatus of claim 8, wherein the blocked network manager receives at least one of a Mobile Country Code (MCC) and a Mobile Network Code (MNC) of the first network and adds the first network corresponding to the receipt of at least one of the MCC and the MNC to the blocked network list.

14. The apparatus of claim 8, wherein the blocked network manager displays the blocked network list when a blocked network release menu is selected, and removes the selected first network from the blocked network list when the first network is selected from the displayed blocked network list.

* * * * *